US009637571B2

(12) United States Patent
Friederichs et al.

(10) Patent No.: US 9,637,571 B2
(45) Date of Patent: *May 2, 2017

(54) CATALYST SYSTEM AND A PROCESS FOR THE PRODUCTION OF A POLYETHYLENE IN THE PRESENCE OF THIS CATALYST SYSTEM

(75) Inventors: Nicolaas Hendrika Friederichs, Brunssum (NL); Raymond Gerlofsma, Brunssum (NL)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 528 days.

This patent is subject to a terminal disclaimer.

(21) Appl. No.: 12/922,395

(22) PCT Filed: Mar. 10, 2009

(86) PCT No.: PCT/EP2009/001764
§ 371 (c)(1),
(2), (4) Date: Oct. 25, 2010

(87) PCT Pub. No.: WO2009/112254
PCT Pub. Date: Sep. 17, 2009

(65) Prior Publication Data
US 2011/0034650 A1 Feb. 10, 2011

(30) Foreign Application Priority Data
Mar. 14, 2008 (EP) .................... 08004764

(51) Int. Cl.
C08F 4/44 (2006.01)
B01J 31/00 (2006.01)
C08F 10/02 (2006.01)
C08F 110/02 (2006.01)

(52) U.S. Cl.
CPC ............ C08F 10/02 (2013.01); C08F 110/02 (2013.01); *Y02P 20/52* (2015.11)

(58) Field of Classification Search
CPC ...... C08F 4/44; C08F 4/06; C08F 4/42; C08F 4/52; C08F 4/02; C08F 4/60; B01J 37/00; B01J 21/00; B01J 31/00
USPC ... 526/124.5, 125.3, 126, 185, 124.7, 124.8, 526/148, 151; 502/153
See application file for complete search history.

(56) References Cited

U.S. PATENT DOCUMENTS

| | | | |
|---|---|---|---|
| 2,985,617 A | 5/1961 | Salyer et al. | |
| 4,178,300 A | 12/1979 | van den Berg | |
| 4,218,339 A | 8/1980 | Zucchini et al. | |
| 4,226,964 A | 10/1980 | Tanaka et al. | |
| 4,305,840 A | 12/1981 | Zucchini et al. | |
| 4,429,087 A | 1/1984 | Capshew | |
| 4,472,521 A * | 9/1984 | Band | 502/104 |
| 4,525,554 A * | 6/1985 | Tanaka et al. | 526/124.8 |
| 4,814,314 A * | 3/1989 | Matsuura et al. | 502/112 |
| 4,904,630 A * | 2/1990 | Matsuura et al. | 502/119 |
| 4,962,167 A | 10/1990 | Shiraishi et al. | |
| 5,122,494 A | 6/1992 | Job | |
| 5,124,298 A | 6/1992 | Job | |
| 5,371,157 A | 12/1994 | Job | |
| 5,587,440 A * | 12/1996 | Ehlers | C08F 4/655 502/110 |
| 5,693,719 A * | 12/1997 | Goto et al. | 525/324 |
| 6,114,271 A | 9/2000 | Bilda et al. | |
| 6,204,349 B1 | 3/2001 | Shinohara et al. | |
| 6,294,682 B1 | 9/2001 | Rauleder et al. | |
| 6,511,935 B2 | 1/2003 | Job | |
| 6,559,249 B2 | 5/2003 | Yang et al. | |
| 6,777,365 B2 * | 8/2004 | Tanase | C08F 4/6565 423/497 |

(Continued)

FOREIGN PATENT DOCUMENTS

AU 622026 B2 * 5/1989 .............. C08F 10/02
CA 2100143 A1 4/1994

(Continued)

OTHER PUBLICATIONS

English abstract of JP04285606 A.*
English translation of JP 08073388 A.*
International Search Report; International Application No. PCT/EP2009/001764; International Filing Date: Mar. 10, 2009; Date of Mailing: Jun. 9, 2009; 6 Pages.
Written Opinion of the International Searching Authority; International Application No. PCT/EP2009/001764; International Filing Date: Mar. 10, 2009; Date of Mailing: Jun. 9, 2009, 5 Pages.
John M. Kelly; Journal of Macromolecular Science Part C—Polymer Reviews; 2002, vol. C42, No. 3, p. 355-371.
H.L. Stein; Engineered Materials Handbook;Ultra High Molecular Weight Polyethylene; vol. 2 p. 161-171.
Dall Occo; Transition Metals and Organometallics as Catalysts; 1998, p. 209-222.

(Continued)

*Primary Examiner* — Fred M Teskin
*Assistant Examiner* — Elizabeth Eng
(74) *Attorney, Agent, or Firm* — Cantor Colburn LLP

(57) ABSTRACT

The invention relates to a catalyst system comprising
I. a solid reaction product obtained by reaction of:
  (a) a hydrocarbon solution comprising
    (1) an organic oxygen containing magnesium compound or a halogen containing magnesium compound and
    (2) an organic oxygen containing titanium compound and
  (b) a mixture comprising a metal compound having the formula $MeR_nX_{3-n}$ wherein X is a halogenide, Me is a metal of Group III of Mendeleev's Periodic System of Chemical Elements, R is a hydrocarbon radical containing 1-10 carbon atoms and $0 \leq n \leq 3$ and a silicon compound of formula $R_m SiCl_{4-m}$ wherein $0 \leq m \leq 2$ and R is a hydrocarbon radical containing 1-10 carbon atoms wherein the molar ratio of metal from (b): titanium from (a) is lower then 1:1 and
II. an organoaluminium compound having the formula $AlR_3$ in which R is a hydrocarbon radical containing 1-10 carbon atoms.

23 Claims, No Drawings

(56) References Cited

U.S. PATENT DOCUMENTS

| | | | |
|---|---|---|---|
| 7,160,453 | B1 | 1/2007 | Matsumura et al. |
| 2002/0016255 | A1 | 2/2002 | Job |
| 2004/0266609 | A1* | 12/2004 | Tanase .................. C08F 110/06 502/103 |
| 2005/0124488 | A1 | 6/2005 | Kong et al. |
| 2007/0062862 | A1 | 3/2007 | Hughes et al. |
| 2007/0225390 | A1 | 9/2007 | Wang et al. |
| 2007/0299224 | A1 | 12/2007 | Vizzini et al. |
| 2009/0163679 | A1 | 6/2009 | Do Nascimento et al. |
| 2011/0159287 | A1 | 6/2011 | Friederichs et al. |
| 2012/0149857 | A1* | 6/2012 | Friederichs ............. C08F 10/00 526/116 |

FOREIGN PATENT DOCUMENTS

| | | | | |
|---|---|---|---|---|
| CN | 101074275 | A | 11/2007 | |
| EP | 0086481 | A1 | 8/1983 | |
| EP | 0087100 | A1 | 8/1983 | |
| EP | 0317200 | A1 | 5/1989 | |
| EP | 0349146 | A2 | 1/1990 | |
| EP | 0350339 | A2 | 1/1990 | |
| EP | 0398167 | A2 | 11/1990 | |
| EP | 0523785 | A2 | 1/1993 | |
| EP | 0574153 | A1 | 12/1993 | |
| EP | 0594190 | A1 | 4/1994 | |
| EP | 0717055 | A2 | 6/1996 | |
| EP | 0876318 | A1 | 6/1997 | |
| EP | 1661917 | A1 | 5/2006 | |
| JP | 61047712 | A | 3/1986 | |
| JP | EP 0230707 | A2 * | 8/1987 | ............ C08F 10/00 |
| JP | 04285606 | A * | 10/1992 | ............ C08F 10/00 |
| JP | 05301921 | A | 11/1993 | |
| JP | 07196861 | A | 8/1995 | |
| JP | 08073388 | A * | 3/1996 | ............ C07C 31/30 |
| WO | 0100692 | A1 | 1/2001 | |

OTHER PUBLICATIONS

Japanese Patent No. 05301921 (A); Publication Date: Nov. 16, 1993; Machine Translation; 6 Pages.
European Patent No. 0876318; Date of Publication: Nov. 11, 1998; Abstract Only; 1 page.
Chinese Patent No. 101074275 (A); Publication No. Nov. 21, 2007; Abstract Only; 1 Page.
Japanese Patent No. 61047712 (A); Publication Date: Mar. 8, 1986; Abstract Only; 1 Page.
Berzen et al.; "Ultrahigh Molecular Weight Polyethylene (UHMW-PE): Application in Artificial Joints"; The British Polymer Journal; vol. 10; Dec. 1978; pp. 281-287.
Bromstrup, Heiner; "PE 100 Pipe Systems"; 2nd Edition; Published: May 1, 2007; 5 Pages.
Ciardelli et al.; "Active Sites Nature and Behavior in Supported Bimetallic (Titanium & Hafnium) Catalysts for Olefin Polymerization"; Memorias—Simposio Latinoamericano de Polimeros; 3rd Volume; Document No. XP009060181; 1992; 11 Pages.
Extended European Search Report; European Application No. 08004764.0; Date of Mailing: Aug. 22, 2009; 5 Pages.
Masi et al.; "The Role of Hafnium in Supported Titanium/Hafnium Catalysts for Olefin Polymerization"; Macromolecular Chemistry and Physics; vol. 15, Issue Supplement 15; Jun. 1989; pp. 147-165.
Japanese Patent No. 07196861 (A); Publication Date: Aug. 1, 1995; Machine Translation; 13 Pages.
Matsura et al.; "Polymerization catalysts in preparation of propylene polymers"; Chemical Abstracts Service; 1986; 2 pages.
Uiriamu et al.; "Catalysts for oligomerization and polymerization of olefins Catalysts for oligomerization and polymerization of olefins"; Chemical Abstracts Service; 1995; 2 pages.

* cited by examiner

CATALYST SYSTEM AND A PROCESS FOR THE PRODUCTION OF A POLYETHYLENE IN THE PRESENCE OF THIS CATALYST SYSTEM

The present invention relates to a catalyst system and to a process for the production of polyethylene in the presence of this catalyst system.

The catalytic production of polyethylene is very well known in the art. A very special class of polyethylene is ultra high molecular weight polyethylene (UHMWPE) with a very high average molecular weight ranging from about 1000000 to well above 6000000 grams/mole whereas high density polyethylene (HDPE) typically has a molar mass between about 50000 and 300000 g/mol. Therefore, these linear polymers have an average molecular weight much higher than that of linear high density polyethylene. The polymer synthesis to obtain UHMWPE is disclosed in Journal of Macromolecular Science Part C Polymer Reviews, Vol. C42, No 3, pp 355-371, 2002. The higher molecular weight gives UHMWPE the unique combination of characteristics making it suitable for applications where lower molecular weight grades fail. The very high molecular weight of this polyethylene results in excellent properties for example a very high abrasion resistance, a very high impact resistance, a very high melt viscosity and a low dynamic coefficient of friction. Because of the high molecular weight and the high melt viscosity specialized processing methods like compression moulding and ram extrusion are applied. Due to the high molecular weight, UHMWPE displays a bad flowability when molten, it is difficult to mould it into a pellet form and the product has to be delivered in a powder form and even more important, it has also to be processed from powder. Consequently, the powder properties heavily determine the production process as well as the converting process. For example, this powder has to be stored and to be transported, and consequently the bulk density of the UHMWPE powder is very important. A higher bulk density may decrease clogging at its transportation and it is possible to increase a storable amount per unit volume. By increasing the bulk density, the weight of the UHMWPE per unit volume present in a polymerization vessel can be increased and the concentration of the ultrahigh-molecular-weight polyethylene powder in the polymerization vessel can be enhanced. Similarly in the processing of UHMWPE a high bulk density also is required. As mentioned, typical processing procedures are ram extrusion and compression moulding. Both methods in principle involve sintering of the powder particles. See for example: H. L. Stein in Engineered Materials Handbook, Volume 2: Engineering Plastics, ASM International 1999 page 167-171. In order for this sintering to become effective, it is very important that a dense polymer powder packing is achieved, which translates into a high bulk density. The bulk density of UHMWPE should be above 300 kg/m³ more preferably above 350 kg/m³ and even more preferably above 400 kg/m³. Also the average particle size of the UHMWPE powder is an important characteristic. The average particle size ($D_{50}$) is preferably lower than 250 micrometers, more preferably below 200 micrometers. In addition, the particle size distribution, commonly known as the "span", defined as $(D_{90}-D_{10})/D_{50}$, should be low, preferably below 2, and even more preferably below 1.5.

It is well known that the shape of the polymer powder particles is translated from the shape of the catalyst particles, also known as the replica phenomenon. In general, when this replication takes place, the average particle size of the polymer is proportional to the cube root of the catalyst yield, i.e. the grams of polymer produced per gram of catalyst. See for example Dall'Occo et al, in "Transition Metals and Organometallics as Catalysts for Olefin Polymerization" (Kaminsky, W.; Sinn, H., Eds.) Springer, 1988, page 209-222. Due to this proportionality, one could produce small polymer particles by reducing the catalyst yield, but this causes high catalyst residues in the polymer and also high catalyst costs needed to produce the polymer. This puts severe requirements on the catalyst because a high catalyst activity is required combined with a polymer particle size below 250 μm, preferably below 200 μm.

It is the object of the present invention to provide a catalyst which results in a UHMWPE displaying a high powder bulk density, a narrow span and an average particle size below 250 μm and furthermore shows a high catalyst activity.

The catalyst according to the invention is characterised in that the catalyst system comprises I. the solid reaction product obtained by reaction of:
   (a) a hydrocarbon solution comprising
      (1) an organic oxygen containing magnesium compound or a halogen containing magnesium compound and
      (2) an organic oxygen containing titanium compound and
   (b) a mixture comprising a metal compound having the formula $MeR_nX_{3-n}$ in which X is a halogenide, Me is a metal of Group III of Mendeleev's Periodic System of Chemical Elements, R is a hydrocarbon radical containing 1-10 carbon atoms and $0 \leq n \leq 3$ and a silicon compound of formula $R_mSiCl_{4-m}$ wherein $0 \leq m \leq 2$ and R is a hydrocarbon radical containing 1-10 carbon atoms wherein the molar ratio of metal from (b): titanium from (a) is lower then 1:1 and II. an organoaluminium compound having the formula $AlR_3$ in which R is a hydrocarbon radical containing 1-10 carbon atoms.

Preferred metals of Group III of Mendeleev's Periodic System of Chemical Elements are aluminium and boron.

Preferably the halogenide is Cl.

It is essential that the components of the mixture (b) are used as a mixture in the reaction with the hydrocarbon solution (a) instead of being used separately or sequentially.

According to a preferred embodiment of the invention the metal compound from (b) having the formula $MeR_nX_{3-n}$ is an aluminium compound having the formula $AlR_nX_{3-n}$ in which X is a halogen and R is a hydrocarbon radical containing 1-10 carbon atoms and $0 \leq n \leq 3$.

Preferably the molar ratio of aluminium from (b): titanium from (a) is lower then 1:1.

According to a further preferred embodiment of the invention the catalyst system comprises I. the solid reaction product obtained by reaction of:
   (a) a hydrocarbon solution comprising
      (1) an organic oxygen containing magnesium compound or a halogen containing magnesium compound and
      (2) an organic oxygen containing titanium compound
   (b) a mixture comprising a metal compound having the formula $MeR_nX_{3-n}$ wherein X is a halogen and R is a hydrocarbon radical containing 1-10 carbon atoms and $0 \leq n \leq 3$ and a silicon compound of formula $R_mSiCl_{4-m}$ wherein $0 \leq m \leq 2$ and R is a hydrocarbon radical containing 1-10 carbon atoms wherein the molar ratio of metal from (b): titanium from (a) is lower then 1:1 and (c) post treatment of the obtained solid reaction product with an aluminium compound having the formula $AlR_nCl_{3-n}$ wherein R is a hydrocarbon radical containing 1-10 carbon atoms and $0 \leq n \leq 3$ and II. an organoaluminium compound having the formula $AlR_3$ in which R is a hydrocarbon radical containing 1-10 carbon atoms.

This catalyst results in a polymer having a high powder bulk density, a narrow span and an average particle size below 250 micrometers. Furthermore the catalyst has a high catalyst activity.

According to a preferred embodiment of the invention the metal compound having the formula $MeR_nX_{3-n}$ is an aluminium compound having the formula $AlR_nX_{3-n}$.

Preferably the hydrocarbon solution comprising an organic oxygen containing magnesium compound or a halogen containing magnesium compound is a hydrocarbon solution comprising an organic oxygen containing magnesium compound.

Suitable organic oxygen containing magnesium compounds include for example alkoxides such as magnesium methylate, magnesium ethylate and magnesium isopropylate and alkylalkoxides such as magnesium ethylethylate. Suitable halogen containing magnesium compounds include for example magnesium dihalides and magnesium dihalide complexes. Preferably the halide is chlorine.

Preferably the organic oxygen containing magnesium compound is a magnesium alkoxide.

According to a further preferred embodiment of the invention the magnesium alkoxide is magnesium ethoxide.

Suitable organic oxygen containing titanium compounds may be represented by the general formula $[TiO_x(OR)_{4-2x}]n$ in which R represents an organic radical, x ranges between 0 and 1 and n ranges between 1 and 6.

Suitable examples of organic oxygen containing titanium compounds include alkoxides, phenoxides, oxyalkoxides, condensed alkoxides, carboxylates and enolates.

According to a preferred embodiment of the invention the organic oxygen containing titanium compounds are titanium alkoxides.

Suitable alkoxides include for example $Ti(OC_2H_5)_4$, $Ti(OC_3H_7)_4$, $Ti(OC_4H_9)_4$, and $Ti(OC_8H_{17})_4$.

According to a further preferred embodiment of the invention the titanium alkoxide is $Ti(OC_4H_9)_4$.

Suitable examples of aluminium compounds having the formula $AlR_nX_{3-n}$ include aluminium tri chloride, ethyl aluminium dibromide, ethyl aluminium dichloride, propyl aluminium dichloride, n-butyl aluminium dichloride, isobutyl aluminium dichloride, diethyl aluminium chloride, diisobutyl aluminium chloride, triisobutyl aluminium and tri-n-hexyl aluminium.

According to a preferred embodiment of the invention the organoaluminium halogenide is an organoaluminium chloride, more preferably ethyl aluminium dichloride.

Suitable examples of organoaluminum compound of the formula $AlR_3$ include for example triethyl aluminium, triisobutyl aluminium, tri-n-hexyl aluminium and tri octyl aluminium.

The hydrocarbon solution of organic oxygen containing magnesium compound and organic oxygen containing titanium compound can be prepared according to procedures as disclosed for example in U.S. Pat. No. 4,178,300 and EP-A-876318. The solutions are in general clear liquids. In case there are any solid particles, these can be removed via filtration prior to the use of the solution in the catalyst synthesis.

Although aluminium compounds, specifically aluminumalkylchlorides, are frequently used in the preparation of catalysts for polyolefins, it has surprisingly been found that the amount of aluminium compound in (b) should be unexpectedly low, typically below a molar ratio of aluminum from (b) to titanium from (a) of less then 1.

According to the preferred embodiment of the invention the molar ratio of aluminium from (b): titanium from (a) is lower then 1:1. Preferably this ratio is lower than 0.8:1. More preferably this ratio is lower than 0.6:1.

According to a preferred embodiment of the invention the molar ratio of chlorine from $R_mSiCl_{4-m}$:oxygen as present in the hydrocarbon solution (a) is lower than 3:1 and more preferably lower than 2:1.

In a preferred embodiment of the invention the molar ratio of magnesium:titanium is lower than 3:1.

Preferably the molar ratio magnesium:titanium ranges between 0.2:1 and 3:1.

Generally the molar ratio Al from the aluminium compound in (b+c):Ti ranges between 0.05:1 and 1:1.

According to a preferred embodiment of the invention the molar ratio Al from the aluminium compound in (b+c):Ti ranges between 0.05:1 and 0.8:1.

Generally the average particle size of the catalyst ranges between 3 µm and 30 µm. Preferably this average particle size ranges between 3 µm and 10 µm.

Generally the span of the particle size distribution is lower than 3.

The catalyst of the present invention may be obtained by a first reaction between an organic oxygen containing magnesium compound and an organic oxygen containing titanium compound, followed by dilution with a hydrocarbon solvent, resulting in a soluble complex consisting of a magnesium alkoxide and a titanium alkoxide and thereafter a reaction between a hydrocarbon solution of said complex and the mixture comprising the metal compound having the formula $MeR_nX_{3-n}$ and the silicon compound of formula $R_mSiCl_{4-m}$.

According to a preferred embodiment of the invention the catalyst is obtained by a first reaction between a magnesium alkoxide and a titanium alkoxide, followed by dilution with a hydrocarbon solvent, resulting in a soluble complex consisting of a magnesium alkoxide and a titanium alkoxide and thereafter a reaction between a hydrocarbon solution of said complex and the mixture comprising the aluminium compound having the formula $AlR_nX_{3-n}$ and the silicon compound of formula $R_mSiCl_{4-m}$.

The mixture comprising the aluminium compound having the formula $AlR_nX_{3-n}$ and the silicon compound of formula $R_mSiCl_{4-m}$ is preferably used as a solution in a hydrocarbon.

A subsequent post treatment step in the presence of an aluminium alkyl or aluminium alkyl halogenide is possible.

The sequence of the addition can be either adding the hydrocarbon solution containing the organic oxygen containing magnesium compound and organic oxygen containing titanium compound to the mixture comprising the aluminium compound having the formula $AlR_nX_{3-n}$ and the silicon compound of formula $R_mSiCl_{4-m}$ or the reversed.

Preferably the hydrocarbon solution containing the organic oxygen containing magnesium compound and organic oxygen containing titanium compound is dosed to a stirred hydrocarbon solution comprising the aluminium compound having the formula $AlR_nX_{3-n}$ and the silicon compound of formula $R_mSiCl_{4-m}$.

The temperature for this reaction can be any temperature below the boiling point of the used hydrocarbon. It is however beneficial to use temperatures below 60° C., preferably below 50° C. Generally the duration of the addition is preferably longer than 10 minutes and preferably longer than 30 minutes.

In the reaction of the hydrocarbon solution comprising the magnesium compound, preferably the organic oxygen containing magnesium compound, and an organic oxygen containing titanium compound with the mixture of the halogen containing silicon compound and the aluminium compound, a solid precipitates and after the precipitation reaction the resulting mixture is heated to finish the reaction. After the reaction the precipitate is filtered and washed with a hydrocarbon. Other means of separation of the solids from the diluent and subsequent washings can also be applied, like for example multiple decantation steps. All steps should be performed in an inert atmosphere of nitrogen or another suitable inert gas. The post treatment with an aluminium compound can be performed either before the filtration and washing steps or after this procedure.

An advantage of the catalyst according to the invention is that the productivity of the catalysts is high and consequently the catalyst residues in the polymer are very low. An additional advantage of the catalyst is that the synthesis to produce the catalyst is relatively simple and cheap based on readily available and relatively easy to handle compounds.

According to a preferred embodiment of the invention the catalyst is used in a process for the polymerisation of ethylene.

The present invention is also directed to a process for the production of polyethylene characterised in that the polymerisation takes place in the presence of a catalyst system comprising I. a solid reaction product obtained by reaction of:
  (a) a hydrocarbon solution comprising
    (1) an organic oxygen containing magnesium compound or a halogen containing magnesium compound and
    (2) an organic oxygen containing titanium compound and
  (b) a mixture comprising a metal compound having the formula $MeR_nX_{3-n}$ wherein X is a halogenide, Me is a metal of Group III of Mendeleev's Periodic System of Chemical Elements, R is a hydrocarbon radical containing 1-10 carbon atoms and $0 \leq n \leq 3$ and a silicon compound of formula $R_mSiCl_{4-m}$ wherein $0 \leq m \leq 2$ and R is a hydrocarbon radical containing 1-10 carbon atoms wherein the molar ratio of metal from (b): titanium from (a) is lower then 1:1 and
II. an organoaluminium compound having the formula $AlR_3$ in which R is a hydrocarbon radical containing 1-10 carbon atoms.

According to a preferred embodiment the metal compound is an aluminium compound having the formula $AlR_nX_{3-n}$ in which X is a halogenide and R is a hydrocarbon radical containing 1-10 carbon atoms and $0 \leq n \leq 3$.

According to a further preferred embodiment of the invention the process takes place in the presence of a catalyst system comprising I. a solid reaction product obtained by reaction of:
  (a) a hydrocarbon solution comprising
    (1) an organic oxygen containing magnesium compound or a halogen containing magnesium compound and
    (2) an organic oxygen containing titanium compound and
  (b) a mixture comprising a metal compound having the formula $MeR_nX_{3-n}$ wherein X is a halogenide, Me is a metal of Group III of Mendeleev's Periodic System of Chemical Elements, R is a hydrocarbon radical containing 1-10 carbon atoms and $0 \leq n \leq 3$ and a silicon compound of formula $R_mSiCl_{4-m}$ wherein $0 \leq m \leq 2$ and R is a hydrocarbon radical containing 1-10 carbon atoms wherein the molar ratio of metal from (b): titanium from (a) is lower then 1:1 and
  (c) post treatment of the obtained sold reaction product with an aluminium compound having the formula $AlR_nCl_{3-n}$ wherein R is a hydrocarbon radical containing 1-10 carbon atoms and $0 \leq n \leq 3$ and
II. an organoaluminium compound having the formula $AlR_3$ in which R is a hydrocarbon radical containing 1-10 carbon atoms.

According to a preferred embodiment the metal compound from (b) is an aluminium compound having the formula $AlR_nX_{3-n}$ in which X is a halogenide and R is a hydrocarbon radical containing 1-10 carbon atoms and $0 \leq n \leq 3$.

The process results in polyethylene having the required properties and a high bulk density. The process is very suitable for the production of UHMWPE.

Besides UHMWPE also high density polyethylene and linear low density polyethylene may be produced with the process according to the invention. The obtained particle morphology is excellent, which will be beneficial to all particle forming polymerization processes.

According to a preferred embodiment of the invention the process is directed to the production of ultra high molecular weight polyethylene.

Generally the bulk density of the ultrahigh-molecular-weight polyethylene powder of the invention ranges between 350 kg/m³ and 600 kg/m³ and ranges preferably between 350 kg/m³ and 550 kg/m³

The poured bulk density of the ultrahigh-molecular-weight polyethylene polymer powder of the invention is determined by measuring the bulk density of the polymer powder according to the procedure outlined in ASTM D1895/A.

The ultra high molecular weight ethylene homo polymer and/or co polymer obtained with the process according to the invention is a powder having the following characteristics:
  an average molecular weight higher than 280000 g/mol and lower than 10000000 g/mol
  an average particle size ($D_{50}$) in the range between 50 and 250 micrometer and
  a bulk density in the range between 350 and 600 kg/m³

The polymerization reaction may be performed in the gas phase or in bulk in the absence of an organic solvent, or carried out in liquid slurry in the presence of an organic diluent. The polymerization can be carried out batchwise or in a continuous mode. These reactions are performed in the absence of oxygen, water, or any other compounds that may act as a catalyst poison. Suitable solvents include for example alkanes and cycloalkanes such as for example propane, isobutane, pentane, hexane, heptane, n-octane, iso-octane, cyclohexane, and methylcyclohexane and alkylaromatics such as for example toluene, xylene, ethylbenzene, isopropylbenzene, ethyltoluene, n-propylbenzene and diethylbenzene. The polymerization temperature may range between 20 and 200° C. and preferably between 20 and 120° C. The pressure of a monomer during polymerization is adequately the atmospheric pressure and more preferably 2-40 bars. (1 bar=100000 Pa)

The polymerization may be carried out in the presence of external donors in order to further modify the catalyst performance if this is desired. Suitable external donors are for example organic compounds containing hetero atoms which have at least one lone pair of electrons available for coordination to the catalyst components or aluminum alkyls. Examples of suitable external donors include alcohols, ethers, esters, silanes and amines. The polymerization can be carried out in the presence of an anti-static agent or anti fouling agent in an amount ranging between for example 1 and 500 ppm related to the total amount of reactor contents.

The molecular mass of the polymer can be controlled by any means as known in the art, such as for example by adjustment of the polymerization temperature or by the addition of molecular weight control agents for example hydrogen or zinc alkyls. Due to the very high molecular weight of UHMWPE, it is difficult to analyze its molar mass by for instance Gel Permeation Chromatography (GPC) or Size Exclusion Chromatography (SEC). Hence it is common to measure the viscosity of a dilute solution of UHMWPE, for instance in decalin at 135° C. This viscosity value can subsequently be translated to the molecular weight value.

UHMWPE can be applied in very different areas where excellent impact strength and abrasive wear resistance are required. In medical applications UHMWPE is used in knee, shoulder and hip implants, high strength fibres made from UHMWPE can be found in ballistic cloth, fishing lines and nets and in the mining industry. UHMWPE may be used as hopper or bunker liners.

U.S. Pat. No. 4,962,167 discloses a catalyst for UHMWPE based on magnesium dihalide, titanium alkoxide, treated with the reaction product of aluminium trihalide and a silicon alkoxide. U.S. Pat. No. 4,962,167 does not disclose the use of $R_mSiCl_{4-m}$. According to the examples the bulk densities of the polymers are lower than 340 gram/l. So despite the use of a mixture of a silicon compound and an aluminium compound, the obtained bulk density is below the desired level of at least 350 gram/l.

U.S. Pat. No. 4,218,339 discloses a catalyst made from a hydrocarbon solution containing a complex prepared from magnesium chloride and titanium alkoxide. This complex is treated with a silicon compound that both can act as a chlorination agent and also is capable of reducing the titanium to a lower valence state. Aluminium compounds are explicitly excluded from the preparation.

U.S. Pat. No. 6,511,935 discloses an olefin polymerization catalyst made from a solid precursor comprising magnesium, transition metal and alkoxide. The patent teaches that the morphology of this solid precursor can be preserved by careful chlorination in a multi-step procedure with mixtures of chlorinating agents, frequently containing $SiCl_4$. According to the examples the bulk densities of polyethylene as produced with these catalysts based on a solid precursor and mixtures of chlorinating agents in a multi step procedure are lower than 300 gram/l. This relatively low bulk density is far below the desired level of at least 350 gram/l. U.S. Pat. No. 6,511,935 does not disclose the use of the catalyst in UHMWPE production.

EP-A-717055 and EP-A-594190 disclose the synthesis of a catalyst by reacting in a first step magnesium dichloride and titanium tetra butoxide. In the second step ethyl aluminium dichloride and $SiCl_4$ were sequentially added. In contrast to the sequentially adding as performed in EP-A-717055 it is essential according to the present invention that the metal compound and the silicon compound are applied as a mixture. A catalyst obtained with a process wherein ethyl aluminium dichloride and $SiCl_4$ were sequentially added displays a good catalyst activity however (as illustrated in the following examples) the particle size of the polymer undesirably increases in case the EADC is not present as a mixture with $SiCl_4$. It is essential that the compound $AlR_nCl_{3-n}$ and the compound $R_mSiCl_{4-m}$ are used as a mixture in the reaction with the hydrocarbon solution instead of being used separately or sequentially because only such a mixture results in the desired results. The preferred magnesium compound in the present invention is a magnesium alkoxide.

The invention will be elucidated by means of the following non-restrictive examples.

EXAMPLES

All examples were carried out under a blanket of nitrogen. The solids content in the catalyst suspension was determined in triple by drying 10 ml of a catalyst suspension under a stream of nitrogen, followed by evacuating for 1 hour and subsequently weighing the obtained amount of dry catalyst. The average particle size ($D_{50}$) of the catalyst was determined by the so called laser light scattering method in hexanes diluent, using a Malvern Mastersizer equipment. The average particle size and particle size distribution ("span") of the polymer powders were determined by sieve analyses according to DIN53477.

Example I

Preparation of a Hydrocarbon Solution Comprising the Organic Oxygen Containing Magnesium Compound and the Organic Oxygen Containing Titanium Compound 100 grams of granular $Mg(OC_2H_5)_2$ and 150 milliliters of $Ti(OC_4H_9)_4$ were brought in a 2 liter round bottomed flask equipped with a reflux condensor and stirrer. While gently stirring, the mixture was heated to 180° C. and subsequently stirred for 1.5 hours. During this, a clear liquid was obtained. The mixture was cooled down to 120° C. and subsequently diluted with 1480 ml of hexane. Upon addition of the hexane, the mixture cooled further down to 67° C. The mixture was kept at this temperature for 2 hours and subsequently cooled down to room temperature. The resulting clear solution was stored under nitrogen atmosphere and was used as obtained. Analyses on the solution showed a titanium concentration of 0.25 mol/l.

Example II

Preparation of the Catalyst

In a round bottom flask, equipped with a condensor, a stirrer and a dropping funnel, 300 ml of hexane were added. To this, 2.1 ml of 50% ethylaluminiumdichloride (EADC) in hexane (7.1 mmol Al) were added followed by 10 ml of $SiCl_4$ (87 mmol). The mixture was warmed to 40° C. and the stirrer was started at 750 RPM. Via the dropping funnel, a mixture of 75 ml of the solution obtained in Example 1 and 6.5 ml of $Ti(O-nC_4H_9)_4$ (19 mmol) were added during a period of 2 hours. The slightly pink coloured suspension was subsequently refluxed for 2 hours, whereupon the mixture turned red. The suspension was subsequently cooled down to ambient temperature, filtered and washed 3 times with hexane. Finally the solids were taken up in hexane and stored under nitrogen. Solids concentration was determined at 20 mg/ml. The catalyst had $D_{50}$ of 6.7 μm and a span of 0.9.

Example III

Preparation of the Catalyst

Example II was repeated with the exception that no Ti(O-nC$_4$H$_9$)$_4$ was added and the amount of SiCl$_4$ was 6.7 ml (57 mmol). Solids concentration was determined at 24 mg/ml.

Example IV

Preparation of the Catalyst

Example III was repeated with the exception that the EADC amount was reduced to 2 mmol. Solids concentration was determined at 15 mg/ml.

Example V

Preparation of the Catalyst

Example III was repeated with the exception that the amount of EADC was 4.4 mmol and the reflux time was reduced to 1 hour. Solids concentration was determined at 14 mg/ml.

Example VI

Preparation of the Catalyst

Example III was repeated with the exception that the amount of EADC was 4.4 mmol and the temperature for the preparation of the catalyst was adjusted to 30° C.

Example VII

Preparation of the Catalyst

Example III was repeated with the exception that the amount of SiCl$_4$ was 40 mmol, the amount of EADC was 2.2 mmol and the temperature for the preparation of the catalyst was adjusted to 20° C.

Example VIII

Preparation of the Catalyst

Example III was repeated with the exception that the 4.4 mmol of diethyl aluminium chloride was used instead of 7 mmols of EADC and the hydrocarbon solution from example 1 was dosed in 70 minutes.
Solids concentration was determined at 24 mg/ml. The catalyst had a D$_{50}$ of 9.6 µm and a span of 0.8

Example IX

Preparation of the Catalyst

Example III was repeated with the exception that the amount of EADC was 4.4 mmol. After the mixture was refluxed for 2 hours, the mixture was cooled down to ambient temperature. Via a dropping funnel, a mixture of 10 mmols triisobutyl aluminium and 50 ml hexane were added over 45 minutes time. The suspension was subsequently stirred for 1 hour at ambient temperature, filtrated and washed with hexane. The catalyst had a D$_{50}$ of 6.4 µm and a span of 0.9.

Example X

Preparation of the Catalyst

Example III was repeated with the exception that 1 mmol of EADC was used instead of 7 mmols of EADC.

Example XI

Preparation of the Catalyst

In a round bottom flask, equipped with a condensor, a stirrer and a dropping funnel, 300 ml of hexane were added. To this, 2.6 ml of 50% ethylaluminiumdichloride (EADC) in hexane (8.8 mmol Al) were added followed by 24.8 ml of n-butylSiCl$_3$ (150 mmol). The mixture was warmed to 40° C. and the stirrer was started at 750 RPM. Via the dropping funnel, 150 ml of the solution from Example I was added over a period of 2 hours. The slightly pink coloured suspension was subsequently refluxed for 2 hours, whereupon the mixture turned red. The suspension was subsequently cooled down to ambient temperature, filtered and washed 3 times with hexane. Finally the solids were taken up in hexane and stored under nitrogen.
Solids concentration was determined at 36 mg/ml.

Comparative Example A

Preparation of a Catalyst in the Absence of an Aluminium Compound Having the Formula AlR$_n$Cl$_{3-n}$ In a round bottom flask, equipped with a condensor, a stirrer and a dropping funnel, 300 ml of hexane were added. To this, 6.5 ml of SiCl$_4$ (57 mmol) was added. The mixture was warmed to 40° C. and the stirrer was started at 750 RPM. Via the dropping funnel, 75 ml of the solution from Example I was added over a period of 2 hours. The white suspension was subsequently refluxed for 2 hours. The suspension was subsequently cooled down to ambient temperature, filtered and washed 3 times with hexane. Finally the solids were taken up in hexane and stored under nitrogen.
Catalyst concentration was determined at 15 mg/ml. The catalyst had a D$_{50}$ of 9.9 µm and a span of 0.8

Comparative Example B

Preparation of a Catalyst Wherein the Aluminium Compound Having the Formula AlR$_n$Cl$_{3-n}$ and the Compound R$_m$SiCl$_{4-m}$ Were Added Sequentially In a round bottom flask, equipped with a condensor, a stirrer and a dropping funnel, 300 ml of hexane were added. To this, 6.5 ml of SiCl$_4$ (57 mmols) was added. The mixture was warmed to 40° C. and the stirrer was started at 750 RPM. Via the dropping funnel, 75 ml of the solution from Example I was added over a period of 2 hours. The white suspension was subsequently refluxed for 2 hours. The suspension was subsequently cooled down to ambient temperature. Then, a mixture of 4.4 mmol EADC and 50 ml of hexane were added in 30 minutes. The resulting mixture was heated to reflux temperature and kept at this temperature for 2 hours. The slurry was cooled down to ambient temperature, filtered and washed 3 times with hexane. Finally the solids were taken up in hexane and stored under nitrogen.
Catalyst concentration was determined at 33 mg/ml.

Comparative Example C

Production of a Catalyst Wherein the Aluminium Compound Having the Formula $AlR_nCl_{3-n}$ as Added in a Molar Ratio Aluminium:Titanium>1

This catalyst was prepared in a similar procedure as in example II, but the extra $Ti(O-nC_4H_9)_4$ was omitted and the amount of EADC was increased to 70 mmols, which results in an Al to Ti molar ratio of 3.7.

Examples XII-XXIV and Comparative Examples D-F

Polymerizations in the Presence of the Catalysts According to Examples II-XI and According to Comparative Examples A-C The polymerizations were carried out in a 10 liter autoclave using 5 liter purified hexanes as a diluent. 8 mmols of tri-isobutylaluminium were added to the 5 liter purified hexanes. The mixture was heated to 75° C. and pressurized with ethylene. Subsequently a slurry containing the predetermined amount of a catalyst according to the Examples II-XI was dosed. The temperature was maintained at 75° C. and the pressure was kept constant by feeding ethylene. The reaction was stopped when approximately 475 grams of ethylene has been supplied to the reactor. Stopping was performed by de-pressurizing and cooling down the reactor. The reactor contents were passed through a filter; the wet polymer powder was collected, subsequently dried, weighed and analyzed.

The results are summarised in Table 1.

The Examples XII-XXIV demonstrate that the polymers obtained with the catalyst according to Examples II-XI have a desirable lower average particle size compared with the polymer obtained with the catalyst according to Comparative Example A, often even when the catalyst yield obtained with the catalysts according to the invention is much higher compared to the catalyst from. Comparative Example A.

Additionally, the catalysts according to Examples II-IX have a much higher catalyst activity than the catalyst according to Comparative Example A which was prepared without the use of EADC during the formation of the solid reaction product.

The catalyst from Comparative Example B displays a good catalyst activity, but comparison with the results from the catalysts from Examples II to XI shows that the particle size of the polymer undesirably increases in case the EADC is not present as a mixture with $SiCl_4$ because this component is dosed after the reaction product with $SiCl_4$ has taken place. This demonstrates the necessity that the compound $AlR_nCl_{3-n}$ must be present in the hydrocarbon solution containing the compound $R_mSiCl_{4-m}$ Comparison of the catalysts according to Examples II-XI with Comparative Example C shows that the selection of the amount of the aluminium compound having the formula $AlR_nCl_{3-n}$ is critical. The applied ratio of aluminium to titanium in Comparative Example C results in a very low bulk density and unacceptably high $D_{50}$ of the polymer.

TABLE 1

Polymerization results

| Example | Catalyst from example | Milligrams of catalyst added [mg's] | Ethylene pressure [bar] | CY[1] | CA[2] | Bulk density kg/m[3] | $D_{50}$ of the polymer [μm] | Span | [eta] [dl/g] |
|---|---|---|---|---|---|---|---|---|---|
| XII | II | 40 | 6 | 11.3 | 1.5 | 404 | 171 | 0.6 | 21.4 |
| XIII | III | 20 | 4.5 | 23.8 | 4.2 | 378 | 175 | 1 | 21.7 |
| XIV | IV | 40 | 3 | 11.2 | 2.3 | 404 | 161 | 0.7 | |
| XV | V | 50 | 2.5 | 9.5 | 2.3 | 404 | 156 | 1.2 | |
| XVI | V | 25 | 3.5 | 17.3 | 2.9 | 415 | 176 | 0.8 | |
| XVII | VI | 50 | 2.5 | 8.7 | 2.6 | 410 | 148 | 0.7 | |
| XVIII | VI | 25 | 3.5 | 18.2 | 3.6 | 416 | 193 | 0.8 | |
| XIX | VII | 50 | 4 | 8.9 | 1.6 | 426 | 165 | 0.8 | |
| XX | VII | 25 | 5 | 18.5 | 2.2 | 455 | 208 | 0.6 | |
| XXI | VIII | 40 | 3 | 11.3 | 2.8 | 396 | 211 | 0.7 | 23 |
| XXII | IX | 20 | 4.5 | 21.5 | 4 | 406 | 189 | 0.83 | |
| XXIII | X | 50 | 7.5 | 8.3 | 0.6 | 423 | 167 | 0.7 | |
| XXIV | XI | 50 | 6.5 | 6.9 | 0.5 | 364 | 119 | 0.8 | |
| D | A | 40 | 6 | 10.8 | 0.7 | 398 | 223 | 0.5 | |
| E | B | 34 | 3.5 | 13.4 | 2.7 | 387 | 238 | 0.45 | |
| F | C | 50 | 2.5 | 10 | 4.8 | 213 | 252 | 0.8 | |

[1]Catalyst Yield: kilograms polyethylene per gram of catalyst
[2]Catalyst Activity: kilograms polyethylene per gram of catalyst per hour per bar of ethylene
[3][eta] intrinsic viscosity measured at 135 degrees Celsius in decaline.

Example XXV

Preparation of a Catalyst 400 ml of hexanes were added to a 0.8 L glass reactor, equipped with a condensor, a stirrer, baffles and a peristaltic pump. To this, 17.3 ml of $SiCl_4$ (152 mmol) and 3.5 ml EADC (11.9 mmol) were added. The mixture was at ambient temperature when the stirrer rate was set at 1700 RPM. Via the peristaltic pump, 200 ml of a solution prepared according to the procedure as outlined in Example I was added over a period of 4 hours. The obtained white suspension was subsequently refluxed for 2 hours. The slurry was cooled down to ambient temperature, filtered and washed 3 times with hexane. Finally the solids were taken up in hexane and stored under nitrogen. A sample of the catalyst was used to determine the pore volume via a so called Mercury intrusion measurement. The pore volume was 0.87 cm³/g. The $D_{50}$ of the catalyst was 5.1 μm.

Example XXVI

Preparation of a Catalyst

In a 0.8 liter glass reactor, equipped with a condenser, a stirrer, baffles and a peristaltic pump, 400 ml of hexanes were added. To this, 8.65 ml of $SiCl_4$ (75.8 mmol) and 1.73 ml EADC (5.9 mmol) were added. The mixture was at ambient temperature when the stirrer rate was set at 1700 RPM. Via the peristaltic pump, 100 ml of a solution prepared according to the procedure as outlined Example I was added over a period of 2 hours and 40 min. The white suspension was subsequently refluxed for 2 hours. The slurry was cooled down to ambient temperature, filtered and washed 3 times with hexane. Finally the solids were taken up in hexane and stored under nitrogen. Catalyst concentration was determined at 15.9 mg/ml. A sample of this catalyst was used to determine the pore volume via a so called Mercury intrusion measurement. The pore volume was 1.01 $cm^3/g$. The $D_{50}$ of the catalyst was 5.0 µm.

Example XXVII

Polymerization in the Presence of the Catalyst According to Example XXVI

The polymerization experiment was performed in a 10 liter steel autoclave using 5 liter of a 1.5 millimolar solution $Al(C_2H_5)_3$ in purified hexanes as a diluent. The mixture was heated to 60° C. and pressurized with 6 bars of ethylene. Subsequently 6.3 ml slurry containing in total 100 mg of the catalyst from Example XXVI was dosed to the reactor. Initially, the temperature was maintained at 60° C. and the ethylene pressure was kept constant at 6 bars by feeding ethylene. However, during the course of the experiment, the catalyst activity became very high and the temperature increased to above 60° C. Also the ethylene uptake by the catalyst became so fast that the consumed ethylene could not be compensated by the addition of fresh ethylene because the installed ethylene mass flow controller had reached its maximum capacity, causing the pressure to drop below 6 bars. Still the polymerization was maintained for 180 minutes. After work up of the polymer 4166 grams polyethylene with an average particle size of 160 µm and a bulk density of 486 $kg/m^3$ were obtained.

Example XXVIII

Polymerization in the Presence of the Catalyst According to Example XXVI

Example XXVII was repeated after technical adjustments in the polymerization equipment by increasing the maximum capacity for the ethylene feed and the cooling capacity for the reactor. The temperature and ethylene pressure were maintained at 60° C. and 6 bars.
3177 grams of polyethylene having an average particle size of 153 µm and a bulk density of 460 $kg/m^3$ were produced in 180 minutes.

The invention claimed is:

1. A catalyst system comprising:
   (I) a solid reaction product obtained by reaction of:
   1) a hydrocarbon solution comprising:
      (a) an organic oxygen containing magnesium compound; and
      (b) an organic oxygen containing titanium compound; and
   2) a mixture comprising a metal compound having the formula $MeR_nX_{3-n}$, wherein X is a halogenide, Me is a metal of Group III of Mendeleev's Periodic System of Chemical Elements, R is a hydrocarbon radical containing 1-10 carbon atoms and $0 \leq n \leq 3$, and a silicon compound of formula $R_mSiCl_{4-m}$, wherein $0 \leq m \leq 2$ and R is a hydrocarbon radical containing 1-10 carbon atoms, wherein the molar ratio of metal from 2) to titanium from 1) is lower than 1:1; and
   (II) an organoaluminium compound having the formula $AlR_3$ in which R is a hydrocarbon radical containing 1-10 carbon atoms.

2. The catalyst according to claim 1, wherein the reaction obtaining the solid reaction product further comprises
   3) post treatment of the obtained solid reaction product with an aluminium compound having the formula $AlR_nCl_{3-n}$ wherein R is a hydrocarbon radical containing 1-10 carbon atoms and $0 \leq n \leq 3$.

3. The catalyst according to claim 1, wherein the metal compound having the formula $MeR_nX_{3-n}$ is an aluminium compound having the formula $AlR_nX_{3-n}$ wherein X is a halogenide and R is a hydrocarbon radical containing 1-10 carbon atoms.

4. The catalyst according to claim 1, wherein the molar ratio of chlorine from $R_mSiCl_{4-m}$ to oxygen from the organic oxygen containing magnesium and titanium compounds is lower than 3:1.

5. The catalyst according to claim 1, wherein the molar ratio of magnesium to titanium is lower than 3:1.

6. The catalyst according to claim 1, wherein the organic oxygen containing magnesium compound is a magnesium alkoxide.

7. The catalyst according to claim 6, wherein the magnesium alkoxide is magnesium ethoxide.

8. The catalyst according to claim 1, wherein the organic oxygen containing titanium compound is a titanium alkoxide.

9. The catalyst according to claim 8, wherein the organic titanium alkoxide is $Ti(OC_4H_9)_4$.

10. The catalyst according to claim 1, wherein the organoaluminium compound from (II) is triethylaluminium or triisobutyl aluminium.

11. A process for the production of a catalyst comprising:
   a) first reacting an organic oxygen containing magnesium compound and an organic oxygen containing titanium compound;
   b) followed by diluting with a hydrocarbon solvent, resulting in a soluble complex consisting of a magnesium alkoxide and a titanium alkoxide;
   c) after which reacting the hydrocarbon solution of said complex and a mixture comprising a metal compound having the formula $MeR_nCl_{3-n}$, wherein Me is a metal of Group III of Mendeleev's Periodic System of Chemical Elements, R is a hydrocarbon radical containing 1-10 carbon atoms and $0 \leq n \leq 3$, and a silicon compound of formula $R_mSiCl_{4-m}$, wherein $0 \leq m \leq 2$ and R is a hydrocarbon radical containing 1-10 carbon atoms.

12. The process for the production of the catalyst according to claim 11, wherein the organic oxygen containing magnesium compound is a magnesium alkoxide and the organic oxygen containing titanium compound is a titanium alkoxide, and the metal compound is an aluminium compound having the formula $AlR_nCl_{3-n}$.

13. A process for the production of polyethylene comprising polymerising ethylene in the presence of a catalyst comprising:

(I) a solid reaction product obtained by reaction of:
  1) a hydrocarbon solution comprising:
    (a) an organic oxygen containing magnesium compound and
    (b) an organic oxygen containing titanium compound; and
  2) a mixture comprising a metal compound having the formula $MeR_nX_{3-n}$, wherein X is a halogenide, Me is a metal of Group III of Mendeleev's Periodic System of Chemical Elements, R is a hydrocarbon radical containing 1-10 carbon atoms and $0 \leq n \leq 3$, and a silicon compound of formula $R_mSiCl_{4-m}$, wherein $0 \leq m \leq 2$ and R is a hydrocarbon radical containing 1-10 carbon atoms, wherein the molar ratio of metal from 2) to titanium from 1) is lower than 1:1; and
(II) an organoaluminium compound having the formula $AlR_3$ in which R is a hydrocarbon radical containing 1-10 carbon atoms.

14. A process for the production of an ethylene polymer comprising polymerising ethylene in the presence of a catalyst comprising:
(I) a solid reaction product obtained by reaction of:
  1) a hydrocarbon solution comprising:
    (a) an organic oxygen containing magnesium compound and
    (b) an organic oxygen containing titanium compound; and
  2) a mixture comprising a metal compound having the formula $MeR_nX_{3-m}$, wherein X is a halogenide, Me is a metal of Group III of Mendeleev's Periodic System of Chemical Elements, R is a hydrocarbon radical containing 1-10 carbon atoms and $0 \leq n \leq 3$, and a silicon compound of formula $R_mSiCl_{4-m}$, wherein $0 \leq m \leq 2$ and R is a hydrocarbon radical containing 1-10 carbon atoms, wherein the molar ratio of metal from 2) to titanium from 1) is lower than 1:1; and
(II) an organoaluminium compound having the formula $AlR_3$ in which R is hydrocarbon radical containing 1-10 carbon atoms;
wherein the ethylene polymer has an average molecular weight higher than 280,000 g/mol and lower than 10,000,000 g/mol, an average particle size ($D_{50}$) in the range between 50 and 250 micrometer, and a bulk density in the range between 350 and 600 kg/m$^3$.

15. The process of claim 14, wherein the average particle size ($D_{50}$) is in the range between 50 and 200 micrometer.

16. The process of claim 14, wherein the bulk density is in the range between 400 and 600 kg/m$^3$.

17. The catalyst according to claim 1, wherein when the catalyst is used in the production of polyethylene, the resulting polyethylene has a bulk density in the range between 350 and 600 kg/m$^3$.

18. The catalyst according to claim 17, wherein when the catalyst is used in the production of polyethylene, the resulting polyethylene has a bulk density in the range between 400 and 600 kg/m$^3$.

19. The catalyst according to claim 1, wherein n is less than 3.

20. The catalyst according to claim 1, wherein m is greater than 0.

21. The catalyst according to claim 1, wherein the metal compound comprises aluminium trichloride, ethyl aluminium dibromide, ethyl aluminium dichloride, propyl aluminium dichloride, n-butyl aluminium dichloride, isobutyl aluminium dichloride, diethyl aluminium chloride, diisobutyl aluminium chloride, triisobutyl aluminium, tri-n-hexyl aluminium, or a combination comprising one or more of the foregoing.

22. The catalyst according to claim 1, wherein the ratio is less than or equal to 0.38:1.

23. The catalyst according to claim 1, wherein the hydrocarbon solution consists essentially of the organic oxygen containing magnesium compound and the organic oxygen containing titanium compound.

* * * * *